United States Patent
Harkema et al.

(10) Patent No.: US 11,175,445 B2
(45) Date of Patent: Nov. 16, 2021

(54) HOT SPOT REDUCTION IN SEGMENTED FLEXIBLE LIGHT GUIDES

(71) Applicant: Nederlandse Organisatie voor toegepast-natuurwetenschappelijk onderzoek TNO, s-Gravenhage (NL)

(72) Inventors: Stephan Harkema, Hilversum (NL); Jeroen Van Den Brand, Goirle (NL); Margaretha Maria De Kok, Eindhoven (NL); Adri Van Der Waal, Zaltbommel (NL); Jeroen Franciscus Marinus Schram, Waalre (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/965,729

(22) PCT Filed: Jan. 29, 2019

(86) PCT No.: PCT/NL2019/050049
§ 371 (c)(1),
(2) Date: Jul. 29, 2020

(87) PCT Pub. No.: WO2019/151853
PCT Pub. Date: Aug. 8, 2019

(65) Prior Publication Data
US 2021/0033776 A1 Feb. 4, 2021

(30) Foreign Application Priority Data

Jan. 30, 2018 (EP) .................................. 18154107
Sep. 20, 2018 (EP) .................................. 8195780

(51) Int. Cl.
*G02B 6/00* (2006.01)
*F21V 8/00* (2006.01)

(52) U.S. Cl.
CPC ......... *G02B 6/0061* (2013.01); *G02B 6/0021* (2013.01); *G02B 6/0055* (2013.01); *G02B 6/0068* (2013.01); *G02B 6/0073* (2013.01)

(58) Field of Classification Search
CPC .. G02B 6/0066; G02B 6/0016; G02B 6/0061; G02B 6/0068; G02B 6/0021; G02B 6/0058
See application file for complete search history.

(56) References Cited

U.S. PATENT DOCUMENTS 6,139,163 A 10/2000 Satoh
8,066,408 B2 11/2011 Rinko
(Continued)

FOREIGN PATENT DOCUMENTS

CN 102121668 A 7/2011
JP 2000-149635 A 5/2000
(Continued)

OTHER PUBLICATIONS

European Patent Office, International Search Report in corresponding International Application No. PCT/NL2019/050049, dated Jun. 14, 2019 (3 pages).

*Primary Examiner* — Karabi Guharay
(74) *Attorney, Agent, or Firm* — Leydig, Voit & Mayer, Ltd.

(57) ABSTRACT

Illuminating sections of a light guide with LEDs leads to unwanted light bleeding to other parts of the light guide. Furthermore typically LEDs are placed at a large distance from the area that couples out light from this LED due to a spike in intensity close to the LED. In order to avoid this spike being visible in the lit area the distance is increased which results in unwanted areal increase of the overall system. The present provides a layout to overcome these challenges.

22 Claims, 6 Drawing Sheets

(56) References Cited

U.S. PATENT DOCUMENTS

| | | | |
|---|---|---|---|
| 2006/0044830 A1* | 3/2006 | Inoue | G02B 5/08 362/614 |
| 2007/0274100 A1 | 11/2007 | Yang | |
| 2008/0055935 A1 | 3/2008 | Ono | |
| 2009/0237910 A1 | 9/2009 | Takada | |

FOREIGN PATENT DOCUMENTS

| | | |
|---|---|---|
| JP | 2001-035229 A | 2/2001 |
| JP | 2010-129493 A | 6/2010 |

* cited by examiner

HOT SPOT REDUCTION IN SEGMENTED FLEXIBLE LIGHT GUIDES

CROSS-REFERENCE TO RELATED APPLICATIONS

This patent application is a U.S. National Phase of PCT International Application No. PCT/NL2019/050049, filed Jan. 29, 2019, which claims priority to European Application Nos. 18195780.4, filed Sep. 20, 2018, and 18154107.9, filed Jan. 30, 2018, which are expressly incorporated by reference in their entireties, including any references contained therein.

TECHNICAL FIELD AND BACKGROUND

The present disclosure relates to segmented flexible light guides with improved homogeneous lighting from embedded LEDs.

Illuminating sections of a light guide with LEDs leads to unwanted light bleeding to other parts of the light guide. Furthermore, LEDs are placed at a large distance from the area that couples out light from this LED due to a spike in intensity close to the LED, in a range of 1-10 mm. In order to avoid this spike being visible in the lit area the distance is increased which results in unwanted areal increase of the overall system.

Most typical methods to achieve homogeneity is to either have a large spacing or to have a lot of light diffusion and/or absorption, such that the brightness of light emitting by the light guide is considerably reduced. For neighboring icons that are at close proximity, typical light guides have no solution to reduce the cross talk between these icons to a few % or even 1%. As such, turning on one icon will lead to unwanted light emission from the other icon. Moreover, light guides can be shaped such that light is spread more effectively than would be obtained by only creating an emitting area far away from the LED, 5-10 mm at the least, where the light is more homogenous. But in some cases this distance is far too large.

SUMMARY

The invention proposes an optical design feature that improves the homogeneity of the illuminating section and reduces the distance of the LED to this section. To this end, a display for displaying an illuminated icon or picture is provided comprising a light guide having a incoupling face for receiving one or more LED devices having a principal light emitting direction for defining a light path traveling away from the incoupling face to an outcoupling face defining the icon or picture. The light guide has side border portions blocking light from the LED in a direction sideways from the principal light emitting direction. The light guide is provided in a transparent portion comprising a light homogenization zone with an apex facing the incoupling face extending along the LED device; said homogenization zone distanced from the side face less than a length of the LED device alongside said face and extending along the light emitting direction to about a length of the LED device. In one example an air pocket is provided at the LED that provides refraction of light at the interface with the light guide.

The proposed design provides significant improvement to the homogeneity. Instead of using 5-10 mm spacing between the LED and light emitting section, a distance can be reduced to smaller than 5, possibly even ~3 mm. The light guide may contain a slight air pocket at the LED to provide refraction.

In this way light radiated by LEDs display is homogenous already close to the LED; where it is typically extremely inhomogeneous.

It is furthermore proposed to fuse sections of different optical density of the same material type together to form the appropriate light guide shape. In this way the display has a transparent portion and a border portion that form a single integrated stack of two or more segmented and complementary shaped layers.

Light bleeding may be reduced by creating the light guide out of opaque and transparent sections formed by thermoplastic polyurethane (TPU) material that is fused into a single layer, e.g. by a high temperature step, such as high pressure lamination, and/or providing a cover layer. The light guide is provided as a closed section where light is trapped until it couples out. In the current invention the piece can be fully flexible, containing all elements for an efficient light guide and openings to create any appearance as is desired. This element can be easily integrated into or onto a 3D pre-formed rigid or semi-rigid element, prior or post forming.

By using multiple high temperature TPU's to form a single layer light can be fully blocked between neighboring sections, even with a spacing between transparent sections that is smaller than 1 mm.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
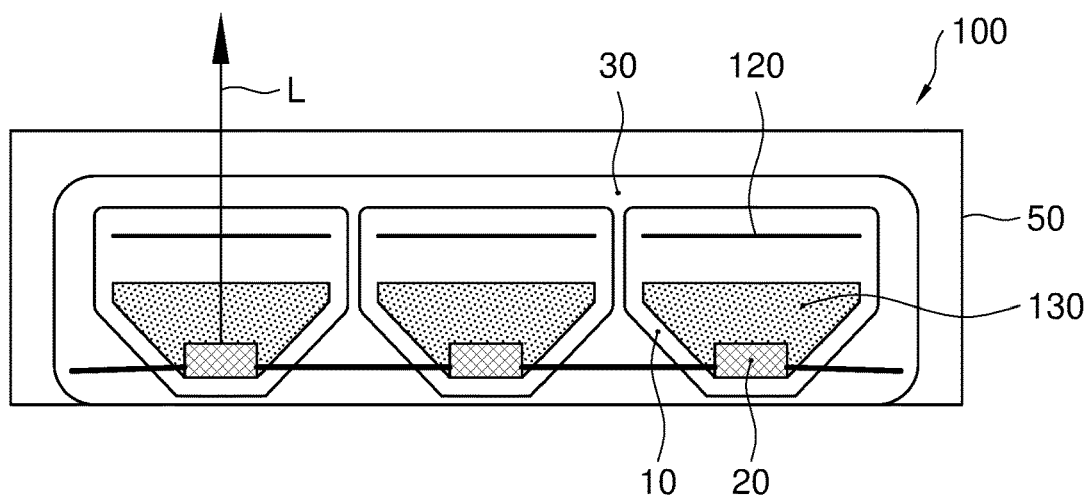
FIG. 1A: A product part using opaque and transparent matrices to create segmentation of the light guide and reduce bleeding to neighboring lighting sectors.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

In FIG. 1A an embodiment is shown wherein a display 100 is formed of light guides 10 and LED devices 20. In more detail a light guide 10 is shown having a incoupling face 110 for receiving one or more LED devices 20 having a principal light emitting direction for defining a light path traveling away from the incoupling face 110 to an outcoupling face 120 defining the icon, slit or picture.

The light guide 10 has side border portions 30 reflecting and/or blocking light from the LED 20 in a direction sideways from the principal light emitting direction L.

Figure 1B:
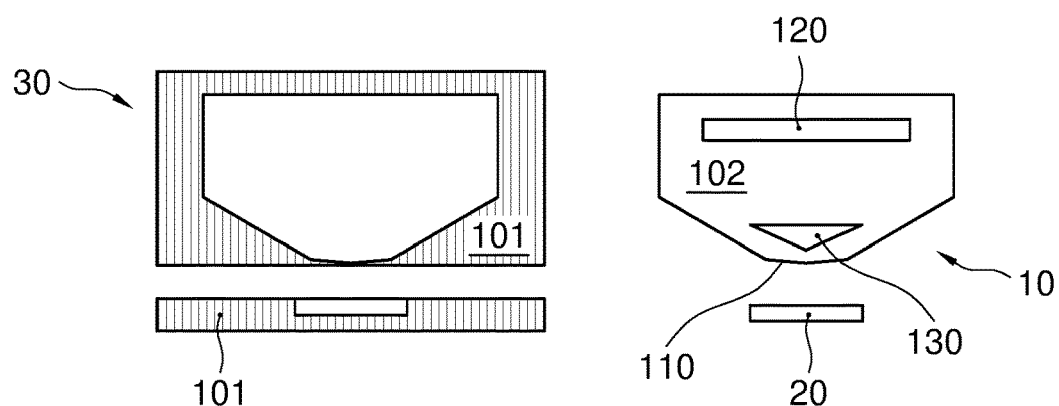
FIG. 1B: example structures at the LED or at the opposing interface. Albeit one structure is drawn, it may be an array of structures. At the LED, an air pocket can be maintained by optimizing its shape, size and separately the lamination process (T and pressure).

In more detail FIG. 1B shows that the light guide 10 is provided with a transparent portion 102 comprising a light homogenization zone 130 with an apex facing the incoupling face 110 extending along the LED device 20. The shape of the light homogenization zone is such that a central apex is formed and side portions with interfaces oriented away from the LED device. The homogenization zone 130 is close to the side face 110, in particular has a distance (measured from the apex) less than a length of the LED device 20 measured alongside its light emitting face. The homogenization zone 130 extends along the light emitting direction L over about a length of the LED device 20. In the example of FIGS. 1A and 1B the homogenization structure 130 is a single triangular cavity; although it could be multiple cavities forming a triangular homogenization structure 130 e.g. having one or more triangular or rounded triangular shapes. The edges of the homogenization structure 130 may further be roughened to improve light diffusion and light mixing in case of using RGB side LEDs.

FIG. 1B shows that the side border portions are provided by a non-transparent material 101 that is formed contiguously and complementary to the light guide 10. White TPU may be used as substrate 102 onto which the electrical design is printed. Alternatively, the TPU may have a white liner or the substrate may be a PEN substrate, with a white coating. Curing of this ink on this TPU is easy due to its high processing temperature of 140° C. The white colour serves to allow reflection at the substrate interface of the generated light originating from LEDs bonded to the printed circuit. Side emitting LEDs 20 may be are bonded onto the Ag printed circuit with a height preferable <2 mm, more preferably <1 mm, etc. High power LEDs are preferred (output >1000 nits). The matrix 101 is may also be formed by a white TPU from which sections are cut by laser or another method. The matrix 101 may also be black, or a combination of black and white, depending on the design. A black TPU would serve to block light as it is fully absorbing, non-transparent. This would lead to loss of the power efficiency of the optical system but on the other hand certifies unwanted light leakage is avoided and thus lighting areas defined sharply.

When combined as in FIG. 1A, the display 100 has transparent portion 102 and the border portion 101 form a single integrated stack 50 of two or more segmented and complementary shaped layers. Combination can be done by separately cutting out the complementary structures, and overlaying both structures to form a single layer. After overlaying, lamination, e.g. by a cover layer (see FIG. 4) can be provided to preserve an integral structure for the device 100.

Figure 1C:
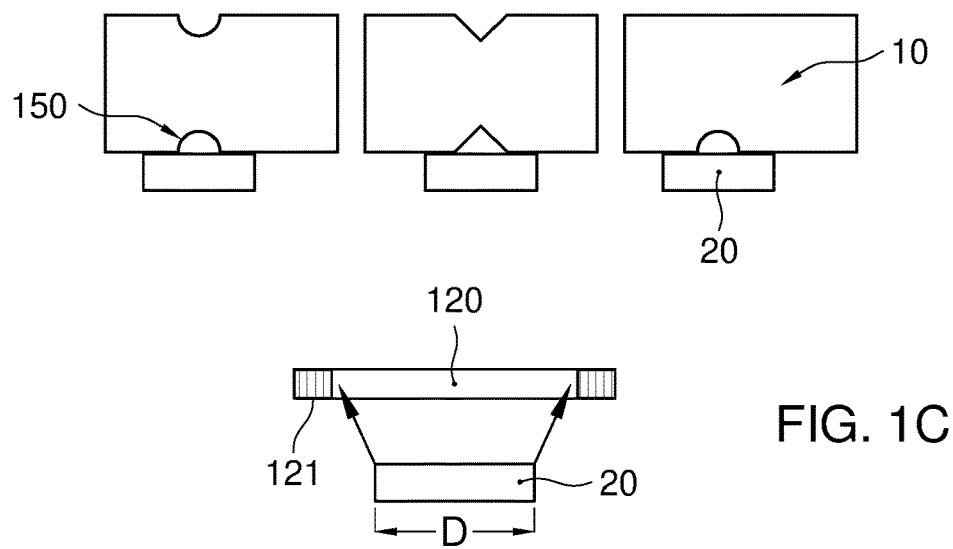
FIG. 1C: shows various shapes of the light guide

FIG. 1C shows that the light guide 10 is not square, or rectangular, but contains shapes that spread the light further to circumvent reduced light intensities on sides 121 compared to the central part of the outcoupling face 120. LEDs strongly couple out at close distance, which makes it difficult to achieve homogeneous emission at this distance, and over larger areas. The light guide may be provided with a patterning on the incoupling face at the location of in-coupling to spread the light. Thus, the incoupling face may be non flat to include a cavity between the incoupling face and the LED device.

For example, the light guide 10 contains an air pocket 150 at the LED light emitting surface 20 that provides refraction of light at the interface with the light guide 10. By these air pockets 150, the length D of the LED can be limited relative to the width of the outcoupling face 120, while still having its sides homogenously illuminated. A typical ratio may be a width of the outcoupling face of about 150-300% of the length D of the LED. The air pockets are triangular in shape, possibly with rounded curves and a roughening on a base side of the triangular of rounded triangular shapes, that prevents color splitting. The opposite side of the incoupling face may be likewise provided with a refractive structure.

Figure 2A:
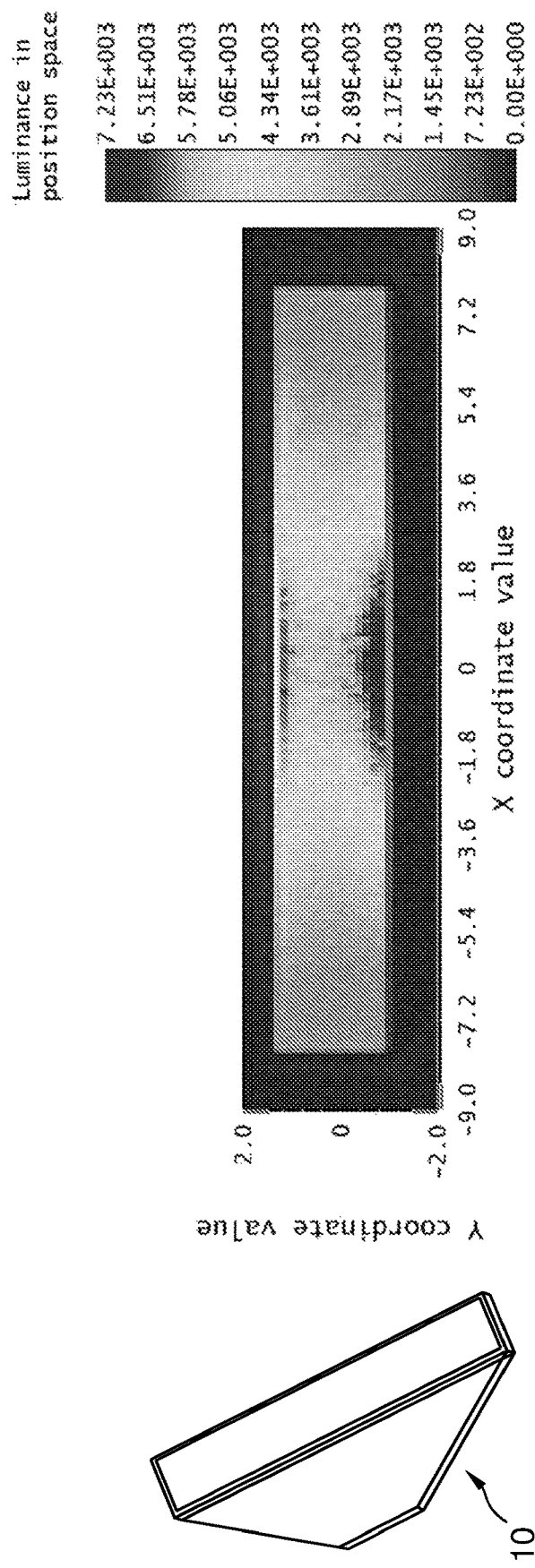
FIGS. 2A-C: homogenization structures and their optical response.
Figure 2A:
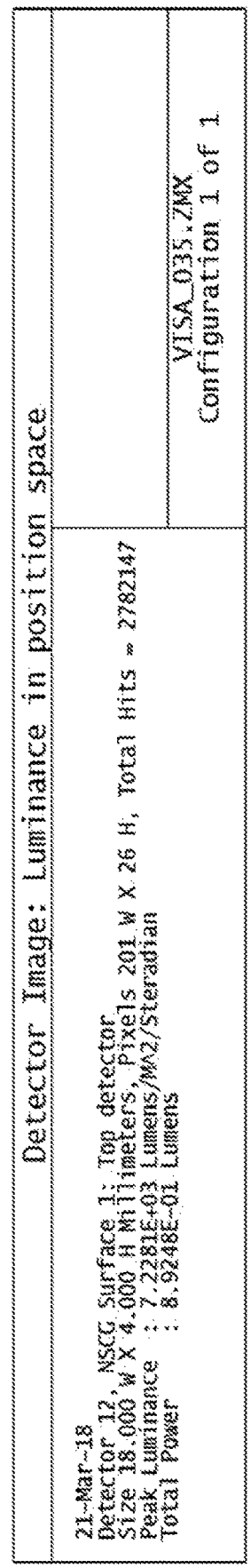
Figure 2B:
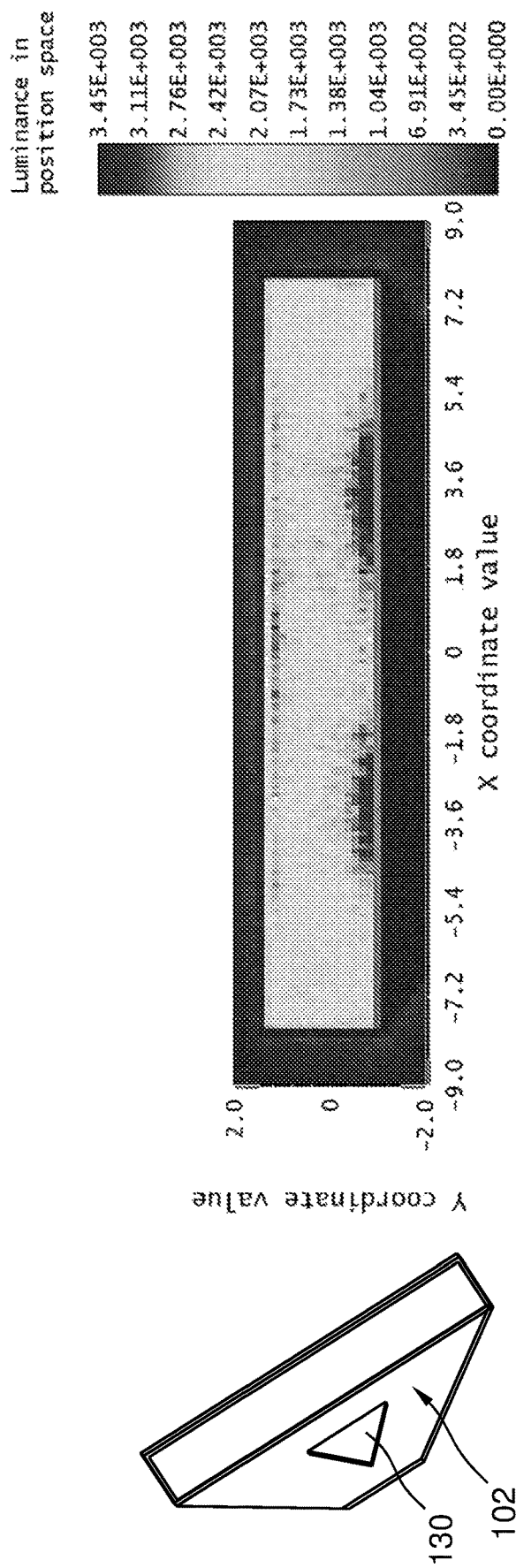
Figure 2C:
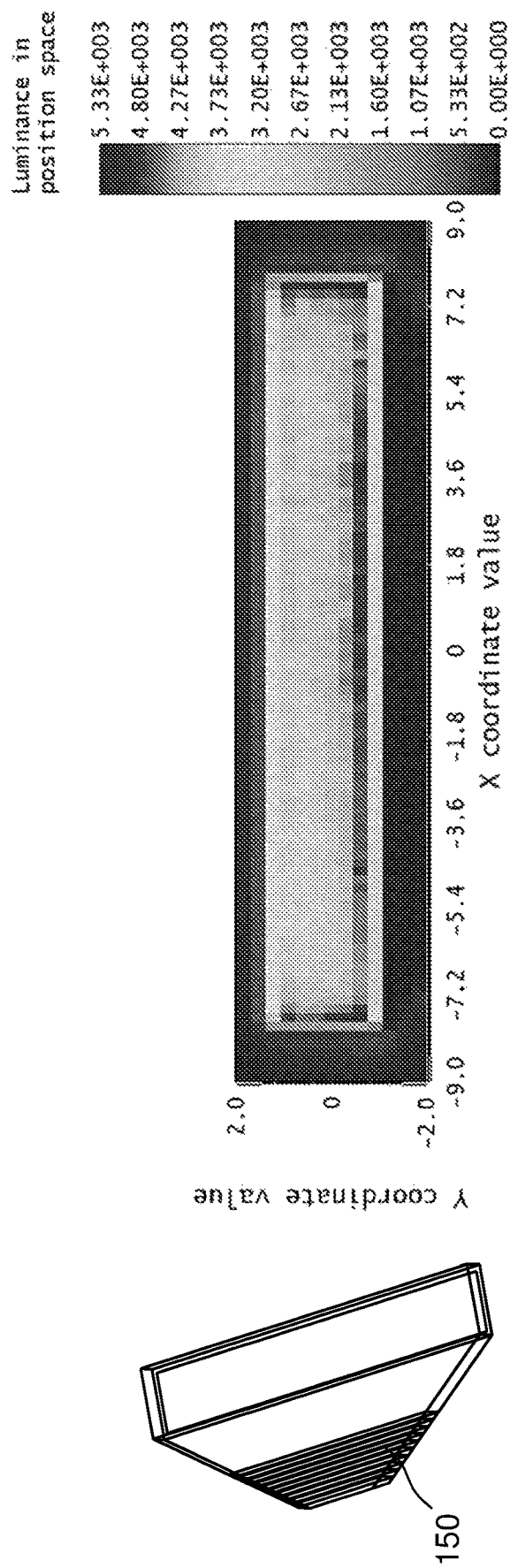

FIGS. 2A-C show optical responses for some homogenization zones of various structures in light guide 10. In FIG. 2A a base optical response is given for the light guide 10, where no homogenization structure is provided. It is shown that the outcoupling face shows inhomogeneity especially near the center. In FIG. 2B a homogenization zone 30 is provided by a single cavity in the transparent portion 102. It is shown that the homogeneity is improved especially towards the sides. In FIG. 2 C an excellent homogeneity is shown for a homogenization structure in the form of perfect lenses included in the homogenization zone. This embodiment is difficult to manufacture.

Figure 3:
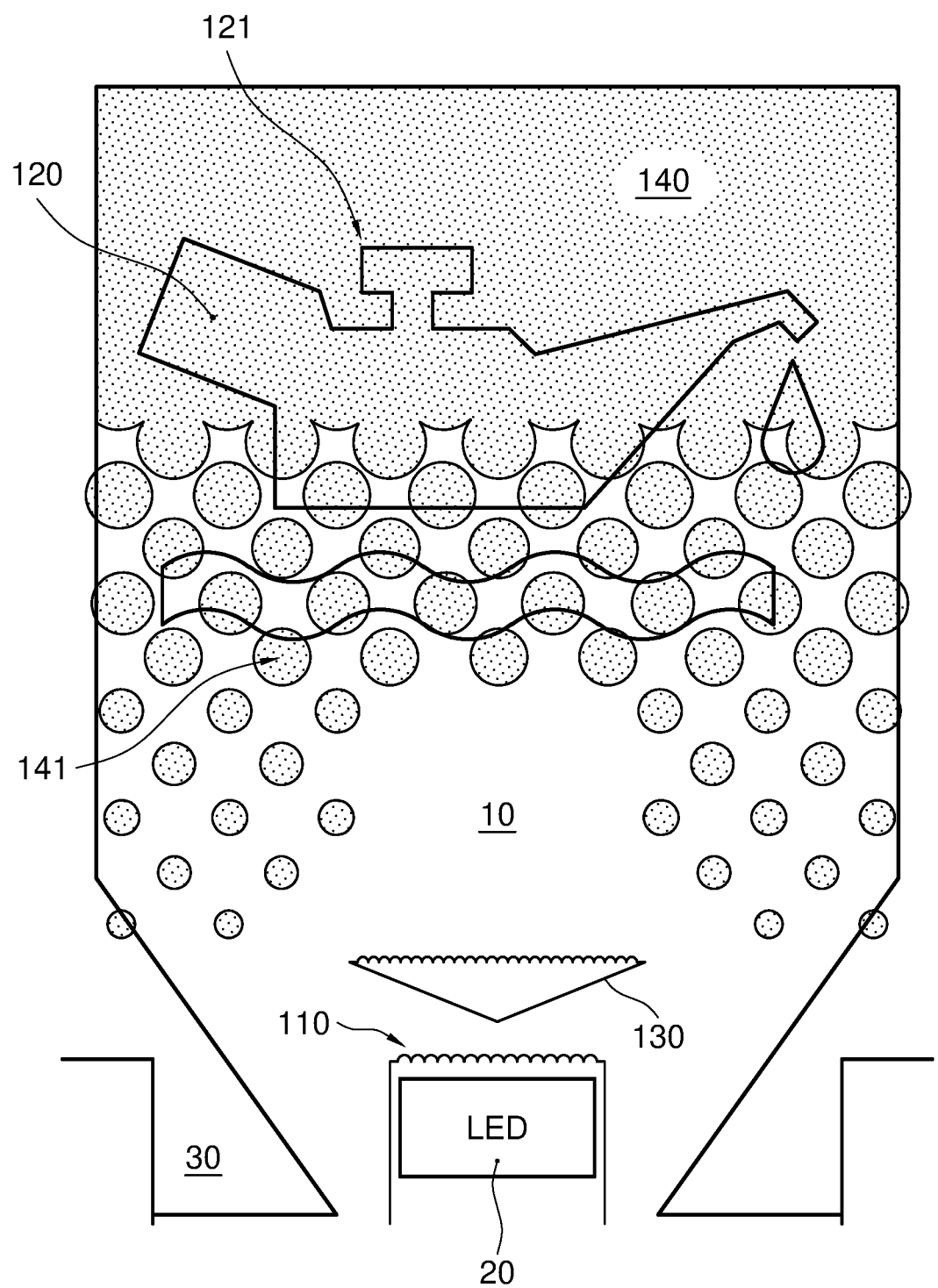
FIG. 3: An exemplary top view of an icon display showing a top face and bottom face containing a pattern for graded light diffusion.

FIG. 3 shows an exemplary top view of an icon display 121 on the outcoupling top face 120 and gradiented bottom face 140 with gradient pattern 140. The gradient pattern is formed in a reflective surface, thus partly reflecting the light emitted from LED 20. The reflective surface is usually provided by a light reflecting coating with a gracliented pattern. The pattern has a decreasing reflection away from the incoupling face 110. In this example, the gradiented light reflecting pattern extends underside the outcoupling face 120.

It is shown that the side faces of the LED incoupling face 110 and/or homogenization zone 130 have a roughening to prevent color splitting e.g. when using RGB LEDs. In this example, the incoupling face 110 receives a LED devices is a side face of a planar transparent layer. LED device 20 is an upstanding LEDs with a thickness corresponding to the transparent layer of light guide 10. The light guide sections 10 may be cut from a transparent or hazy TPU and are positioned inside the border portions 30 of the white light guide. Separately a cover foil (PET, PEN, TPU, PVB, PC or other), optionally hazy or modified to provide light diffusion, can be printed with a reflective coating, e.g. dielectric inks with openings that allow the light to leave the light guide. Alternatively, the cover layer may be a printed coating, e.g. a coating on a TPU layer. This white dielectric reflective coating can be a cover foil aimed towards the TPU during the lamination assembly step of the transparent portion and border portion. On top of the cover foil further layers may be printed (dielectric, anti-scratch or other). Light guiding and out-coupling can be improved by applying an engraving pattern on the interior and or exterior, but may also be incorporated on the inside. This pattern may be random, but may also periodic in nature. For instance, good results can be obtained with engravings of ~30 microns lines with a periodicity of 50 microns that were lasered into PEN and PC with a CO2 laser. In the shown example the light guide is formed by a transparent planar layer of 2 mm thickness and the incoupling face is positioned at a distance of about 5-8 mm away from the outcoupling face. The homogenization zone 130 is provided in a temperature resistant material so that at higher temperatures it's shape is not changed significantly.

Figure 4A:
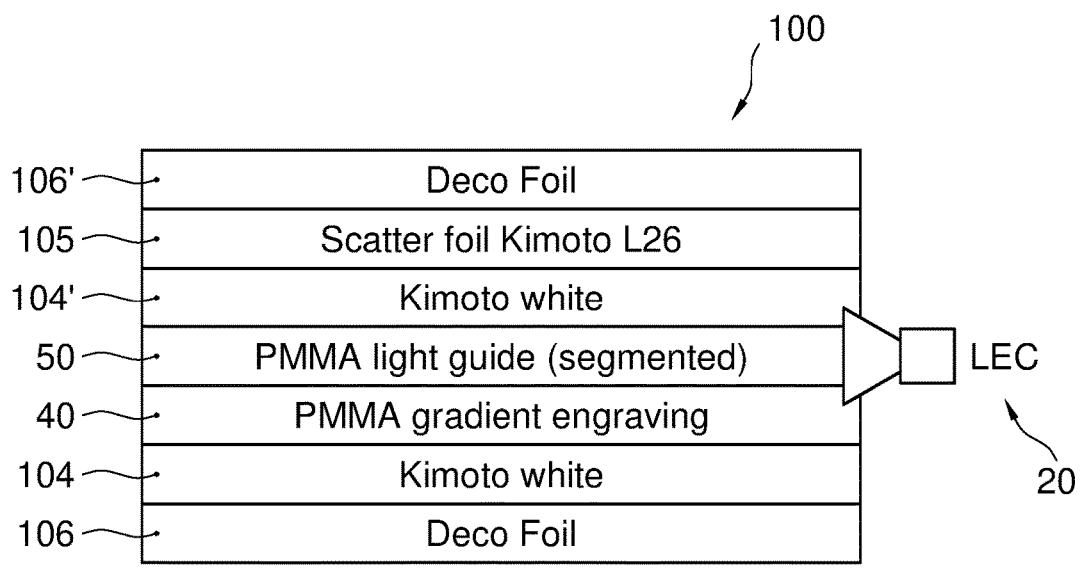
FIGS. 4A-B: An exemplary lamination stack of an assembly where the light guide and reflective side and backside layers are added by injection moulding.

FIG. 4A shows exemplary layer stacks where it is shown that the LED 20 is an LED that couples from the side of the light guide 10. The stack 100 is not to scale, but merely serves to illustrate a number of optional layers. The central light guide layer 50 is segmented from a transparent PMMA. Layer 40 is the PMMA interface that is modified with a gradient engraving for enhanced light guiding. The engraved cover layer 40 is placed in contact with a densite white foil 104 that is laminated onto a bottom decorative foil 106. The light guide stack is optically closed by a white coating 104' and finished by scatter foil 105 and top foil 106'.

Figure 4B:
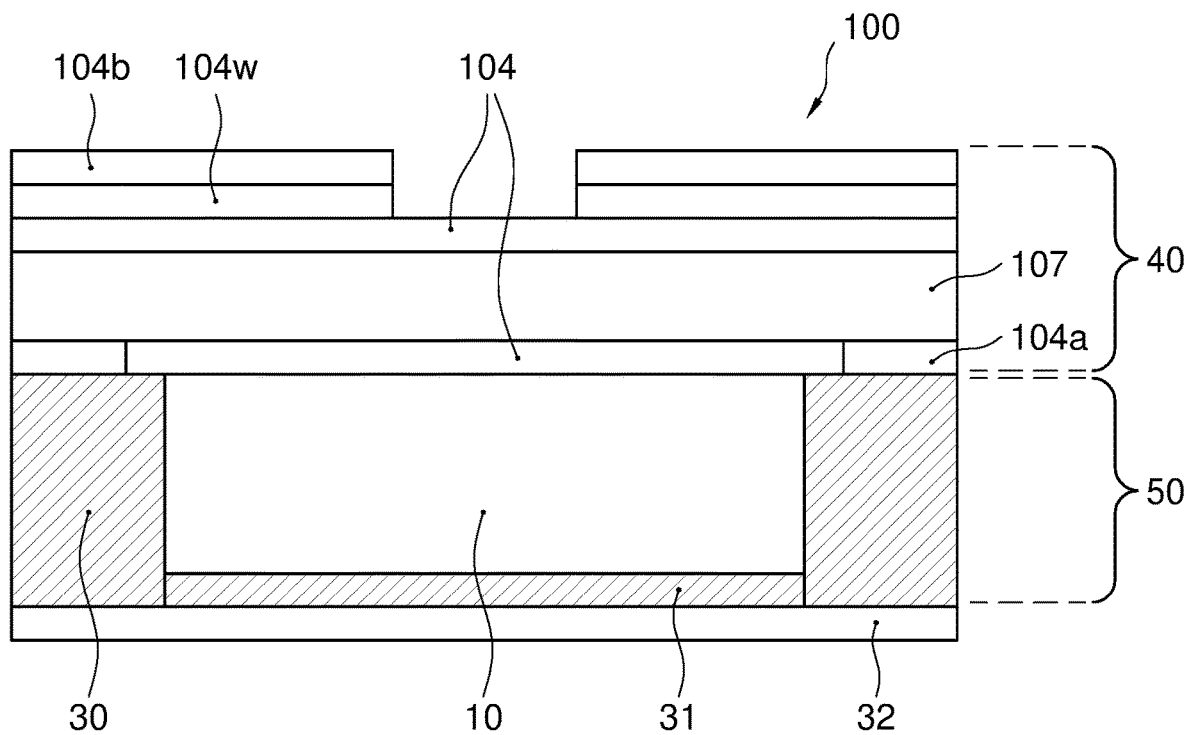

FIG. 4B shows a variant wherein the side border portions and transparent portion are manufactured by injection moulding. In this example, a cover layer 40 is provided e.g. by a coated polycarbonate (PC) transparent front foil 107 of e.g. 250 micron. A reflective white surface 104 is provided by a light reflecting coating with a gradient pattern; thus covering the segmented transparent light guide stack G on the top side with a gradient pattern. The sides 104a of the reflective white coating 104 may be terminated by a black coating blocking light guiding in the cover foil. The PC cover foil 107 is further provided with a top coating 104b, 104w that is a stack of white and black ink—black on the outside. The coating 104 leaves the icon picture free so that the transparent polycarbonate layer shows the icon when illuminated. On the backside of the cover layer 40 the light guide stack G is formed by segmented light side border portions 30 provided by a non-transparent material that is formed contiguously and complementary to transparent portions 10. The light guide 100 thus forms a single integrated stack of two or more segmented and complementary shaped layers 50 and a cover layer 40.

This has as a consequence that the functional layers are provided as a stack, on top of the injected moulding part 50, which serves to provide a suitable thickness. E.g. a backside layer on top of a back substrate may be provided by a TPU layer, but can also be injection moulded. Layer 31 is simultaneously injection moulded with complementary shaped layers 50. By altering the shape from the mould at this side, the shape of layer 31 can be non flat, making it possible to create a non-flat reflecting surface, thereby providing potential beneficial optical effects. Layer 32 is a single or combination of functional and non-functional foils, being flat or containing contacts for via's or slots for backside contacting that are protected during the moulding process. It can also be imagined that functionalities, in the form of chips, sensors or devices, may be added to this part, by which the front part may be contacted or powered. Also top emitting LEDs can be added to layer 32. The stack in FIG. 4 would be altered to injection moulded white shapes 50, but having a white reflecting foil with printed circuit and components as layer 32.

For the purpose of clarity and a concise description, features are described herein as part of the same or separate embodiments, however, it will be appreciated that the scope of the invention may include embodiments having combinations of all or some of the features described.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A display having a display area for displaying an illuminated icon or picture; the display comprising:
   a light guide having an incoupling face for receiving one or more LED devices having a principal light emitting direction for defining a light path traveling away from the incoupling face to an outcoupling face defining the illuminated icon or picture;
   wherein the light guide includes side border portions that block light from the LED devices in a direction sideways from the principal light emitting direction; and
   wherein the light guide includes a transparent portion comprising a light homogenization zone with an apex facing the incoupling face extending along the LED devices; said homogenization zone being distanced from the incoupling face and extending along the light emitting direction to about a length of the LED devices, and wherein the transparent portion and the border portion are formed of two or more segmented and complementary shaped layer pieces.

2. The display according to claim 1, wherein the homogenization zone is provided by one or more cavities in the transparent portion.

3. The display according to claim 2, wherein the sides of the cavities are oriented, relative to the principal light emitting direction, to provide a total internal reflection effect for light emitted from the one or more LED devices.

4. The display according to claim 2, wherein the one or more cavities have one or more triangular or rounded triangular shapes.

5. The display according to claim 2, wherein the one or more cavities are provided with a roughening on a side of the triangular or rounded triangular shapes.

6. The display according to claim 1, wherein the homogenization zone is formed by a single cavity provided in the transparent portion.

7. The display according to claim 1, wherein the incoupling face for receiving one or more LED devices is a side face of a planar transparent layer; and wherein the one or more LED devices are upstanding LEDs having a thickness corresponding to the transparent layer.

8. The display according to claim 7, wherein the incoupling face is non flat to include a cavity between the incoupling face and the one or more LED devices.

9. The display according to claim 1, wherein a reflective coating is provided between the transparent portion and the border portion.

10. The display according to claim 1, wherein the side border portions are provided by a non-transparent material that is formed contiguously and complementary to the transparent portion.

11. The display according to claim 1, wherein the transparent portion and the border portion form a single integrated stack of:
two or more segmented and complementary shaped layers, and
a cover layer.

12. The display according to claim 11, wherein the single integrated stack is provided contiguous to the one or more LED devices arranged as an array of LED devices, each of the LED devices of the array of LED devices facing a respective transparent portion having an outcoupling face.

13. The display according to claim 11, wherein the cover layer is provided with a light reflecting coating.

14. The display according to claim 13, wherein the light reflecting coating has a gradiented pattern with decreasing reflection away from the incoupling face that is provided on the bottom face of the stack; away from the outcoupling face.

15. The display according to claim 14, wherein the gradiented pattern extends underside the outcoupling face.

16. The display according to claim 1, wherein the light guide is formed by a transparent planar layer in a range of 0.1-5 mm thickness and wherein the incoupling face is positioned at a distance in a range of about 5-8 mm away from the outcoupling face.

17. The display according to claim 1, wherein the side border portions and transparent portion are manufactured by injection moulding.

18. A method of manufacturing a display having a display area for displaying an illuminated icon or picture; the display comprising:
a light guide having an incoupling face for receiving one or more LED devices having a principal light emitting direction for defining a light path traveling away from the incoupling face to an outcoupling face defining the illuminated icon or picture;
wherein the light guide includes side border portions that block light from the LED devices in a direction sideways from the principal light emitting direction;
wherein the light guide includes a transparent portion comprising a light homogenization zone with an apex facing the incoupling face extending along the LED devices; said homogenization zone being distanced from the incoupling face and extending along the light emitting direction to about a length of the LED devices, and wherein the transparent portion and the border portion are formed of two or more segmented and complementary shaped layer pieces,
wherein the method comprising combining two or more segmented and complementary shaped layer pieces of different optical density to form the light guide including the transparent portion and the side border portions.

19. The method according to claim 18, comprising fusing the assembled one or more segmented and complementary shaped layer pieces of different optical density.

20. The method according to claim 19, further comprising overlaying a cover layer and wherein the two or more segmented and complementary shaped sections of layer pieces of different optical density are fused by laminating with the overlying cover layer to form a single integrated stack with the cover layer.

21. The method according to claim 20, comprising providing the cover layer with a light reflecting coating that has a gradient with decreasing reflection away from the incoupling face.

22. The method according to claim 18, comprising injection moulding to form the two or more segmented and complementary shaped sections of layers of different optical density.

* * * * *